Feb. 16, 1960

G. J. WATT 2,925,217

SOUND WAVE RAY TRACER

Filed Oct. 25, 1956

INVENTOR
GORDON JAMES WATT
BY
ATTORNEY

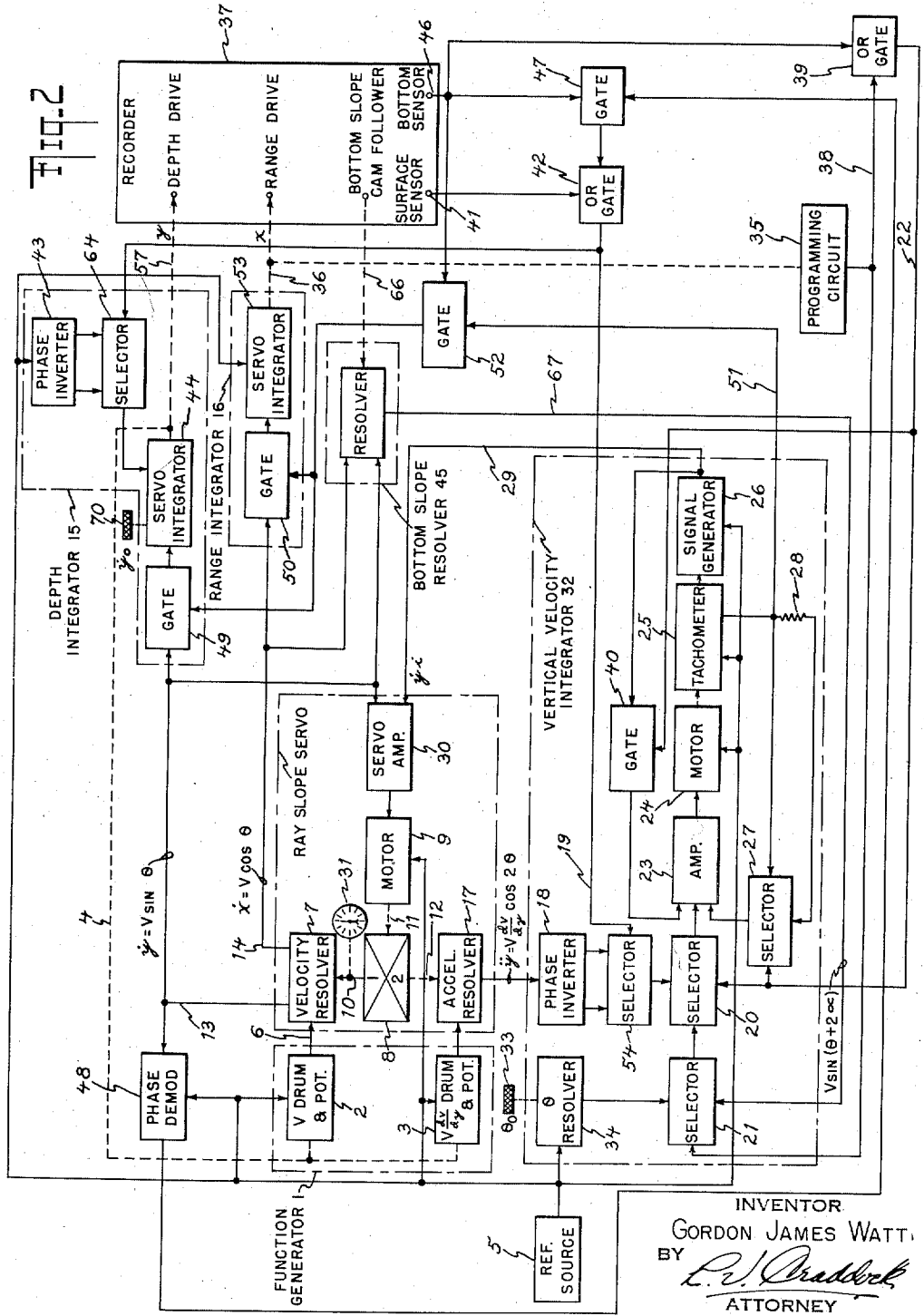

United States Patent Office

2,925,217
Patented Feb. 16, 1960

2,925,217

SOUND WAVE RAY TRACER

Gordon James Watt, Uniondale, N.Y., assignor to Sperry Rand Corporation, a corporation of Delaware Application October 25, 1956, Serial No. 619,914

6 Claims. (Cl. 235—61.6)

This invention relates to analogue computers, and more particularly, is concerned with a computer for tracing the paths of sound waves in a medium where the velocity of propagation is primarily a function of depth.

It is well known that sound rays emanating from a source under water, for example, do not follow straight lines but are deviated due to the change in velocity of the rays at different depths. The resulting sound intensity pattern is rather complex, being made up of regions of greater sound intensity due to the convergence of a number of rays following different paths, and regions of low intensity where substantially no rays may pass. A plot of a set of rays provides a picture of the sound field, and by plotting a large number of rays, the intensity of the rays at various points is an indication of the sound intensity.

Heretofore it has been the practice to plot individual rays by means of computation based upon measured sound velocity vs. depth data, but because of the tremendous amount of work required, only a few rays were plotted to yield an approximate picture of a given sound field. Moreover, the number of graphs representing different depths and different conditions affecting the sound field pattern which could be made by hand was necessarily limited. A mechanical computer and plotter was developed which was capable of tracing ten or fifteen rays an hour, which represented a great improvement over the older manual method. More recently, an all electronic sound wave ray tracer was developed enabling, for the first time, a high speed cathode ray tube plot of a large number of rays from a source of infinitely variable depth. Such a ray tracer is the subject of copending application Serial No. 484,212, filed on January 26, 1955, in the names of Robert B. Blizard, Richard Proskauer and Victor Vacquier.

Certain assumptions were made to simplify the structure and operation of the invention of Serial No. 484,212 including (1) that the sound rays to be plotted make only a small angle with respect to the horizontal and (2) that the sound rays being traced are not deviated to such an extent that they were reflected from the bottom of the propagating medium such as, for example, the bottom of the ocean.

It is the general object of this invention to avoid the foregoing limitations in the prior art methods by the provision of an improved sound ray tracer which is capable of very rapidly computing and plotting a family of sound rays from measured data of sound velocity in a medium as a function of depth.

A more specific object is to provide an analogue computer for plotting a family of sound rays irrespective of the angular orientation of the sound ray source.

An additional object is to provide means for introducing the effect of bottom reflections in the computation prerequisite to plotting a family of sound rays propagating through a medium.

Yet another object is to provide an improved sound ray tracer producing a permanent record of the sound ray pattern.

These and other objects of the invention which will become apparent as the description proceeds are achieved by the provision of a computer including a function generator for producing voltages proportional to velocity and the product of velocity and velocity gradient of a sound ray propagating through a medium as a function of the depth of the sound source located in the medium. The generated voltages are resolved to produce vertical and horizontal components thereof. The vertical component of velocity is integrated to produce depth while the horizontal component of velocity is integrated to produce range. The vertical component of the product of velocity and velocity gradient is multiplied by the cosine of twice the angle of propagation of the sound ray relative to the horizontal and then integrated to yield a computed vertical component of sound ray velocity. The computed vertical velocity component is compared with the generated vertical velocity component, the difference therebetween activating a servo, in turn producing continuous angular information respecting the direction of sound ray propagation relative to the horizontal. Provision is included for continuously tracing sound rays when said rays are reflected from the top and bottom boundaries of the propagating medium. Additionally, means are included for rendering a permanent record of the computed sound rays.

For a better understanding of the invention, reference should be had to the accompanying drawings, wherein:

Fig. 2 is a block diagram detailing the features of a preferred embodiment of the present invention.

The basis of the present invention can best be understood by referring to Huygen's principle which states that spherical wavelets originate from each point of a propagating wave front and travel with a velocity determined by the properties of the local medium. The envelope of these spheres, an instant later, determines a new wave front from which new spherical wavelets originate, and so on. The geometry of such wave propagation is illustrated in Fig. 1 in which the symbols represent:

$x$=The distance of propagation in the horizontal direction in the horizontal direction (range).
$y$=Depth.
$S$=The distance of propagation along the ray.
$n$=Direction normal to the ray.
$\theta$=The slope of the ray front.
$V$=Velocity of wave front along the ray.

Figure 1:
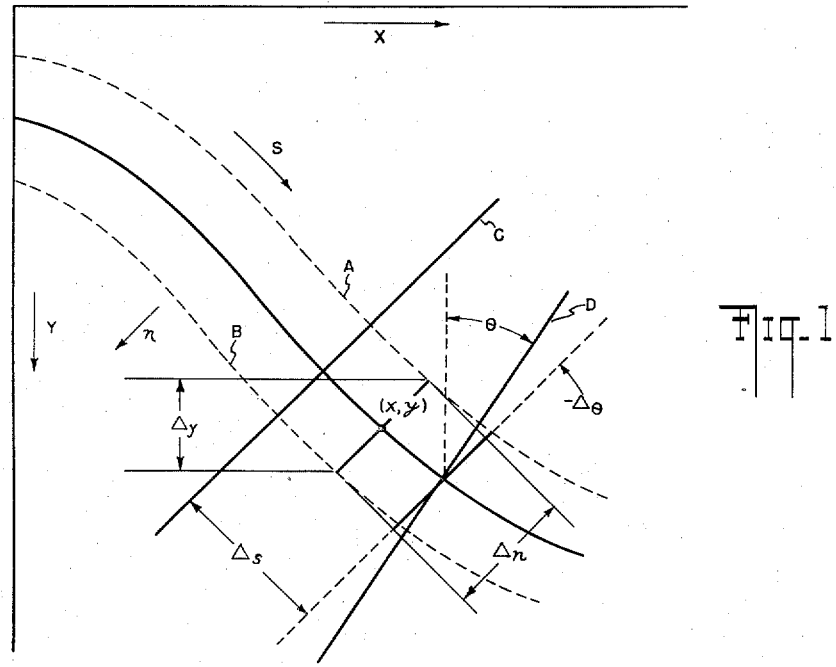
Fig. 1 is a geometric representation of sound rays propagating through a medium used in developing the equations defining the path of said rays.

In Fig. 1, two parallel, adjacent rays A and B, and two successive wave fronts C and D are considered. The rays are separated by the distance $\Delta n$, and the wave fronts by $\Delta S$ where $$\Delta S = V \Delta t \qquad (1)$$

and $$\Delta n = \frac{\Delta y}{\cos \theta} \qquad (2)$$

Since the lower ray B is presumed to be in a region of greater velocity, the wave front in that region will travel faster than that along the upper ray A; consequently, the slope of the ray front will change by an angle of $-\Delta\theta$. Geometrically, the angle $-\Delta\theta$ can be expressed as the difference in distance $\Delta S$ along the two rays divided by the normal distance $\Delta n$ between them, or:

$$-\Delta\theta = \frac{\left[V\left(y+\frac{\Delta y}{2}\right) - V\left(y-\frac{\Delta y}{2}\right)\right]\Delta t}{\frac{\Delta y}{\cos \theta}} = \sin(-\Delta\theta) \qquad (3)$$

Equation 3 is true as long as $\Delta\theta$ is small. By rearranging Equation 3 to indicate a time rate of change of $\theta$, $$-\frac{\Delta\theta}{\Delta t}=\frac{\Delta V}{\Delta y}\cos\theta \quad (4)$$

The limit of Equation 4 as $\Delta t$ and $\Delta y$ approach zero requires that $\Delta\theta$ remain small, or $$\lim_{\substack{\Delta t\to 0\\ \Delta y\to 0\\ \Delta\theta\to 0}} -\frac{\Delta\theta}{\Delta t}\frac{\Delta V}{\Delta y}\cos\theta = -\frac{d\theta}{dt}=\frac{dV}{dy}\cos\theta \quad (5)$$

The first two basic equations of the problem can be derived directly from the geometry of Fig. 1.

$$\dot{x}=\frac{dx}{dt}=V\cos\theta \quad (6)$$

and $$\dot{y}=\frac{dy}{dt}=V\sin\theta \quad (7)$$

These equations express the $x$ and $y$ components of ray velocity. Similar expressions can be found for acceleration in the $x$ and $y$ directions by taking the derivatives of Equations 6 and 7 and combining with Equation 5. The time derivative of Equation 6 becomes $$\ddot{x}=\frac{d^2x}{dt^2}=-V\sin\theta\frac{d\theta}{dt}+\frac{dV}{dt}\cos\theta \quad (8)$$

Since $$\frac{dV}{dt}=\frac{dV}{dy}\cdot\frac{dy}{dt}$$

from Equation 7 it follows that $$\frac{dV}{dt}=\frac{dV}{dy}V\sin\theta \quad (9)$$

Substituting (5) and (9) in (8), $$\ddot{x}=V\sin\theta\left[\frac{dV}{dy}\cos\theta\right]+V\sin\theta\left[\frac{dV}{dy}\cos\theta\right]$$

$$=V\frac{dV}{dy}(2\sin\theta\cos\theta)$$

$$=V\frac{dV}{dy}\sin 2\theta \quad (10)$$

Similarly, $$\ddot{y}=-V\frac{dV}{dy}\cos 2\theta \quad (11)$$

Equations 6, 7 and 11 are those which are solved by the computer of the present invention.

Referring to the block diagram of the computer of Fig. 2, the numeral 1 indicates generally a function generator for producing two voltages each respectively representing velocity (V) and the product of velocity and velocity gradient $$\left(V\frac{dV}{dy}\right)$$

of a sound ray propagating through a medium as a function of the depth of the propagating ray within the medium. Numerals 2 and 3 generally designate the $$V \text{ and } V\frac{dV}{dy}$$

voltage generators. Each generator may simply comprise, for example, a cylindrical drum around which is wrapped, respectively, a raised conductive graph of velocity (V) and a raised conductive graph of the product of velocity and velocity gradient $$\left(V\frac{dV}{dy}\right)$$

Each raised conductive graph is rotated with its respective drum by means of a mechanical input derived from the depth drive of the recorder as represented by shaft 4, and is brought into electrical contact with a respective stationary potentiometer. Additionally, each said graph is connected as the slider of its corresponding potentiometer. Thus, as a conductive graph is caused to rotate relative to a corresponding stationary potentiometer as a function of depth, a potential is produced in the conductive graph proportional in amplitude, for example, to the velocity (V) of the sound ray propagating medium at a depth corresponding to the angular displacement of the rotatable drum. The potentiometers included in blocks 2 and 3 are energized by reference source 5. Alternatively, conventional precision-wound potentiometers may be used, each wound according to its respective function of V or $$V\frac{dV}{dy}$$

and having a slider movable in response to shaft 4.

A voltage proportional to velocity, appearing on lead 6 at the output of drum and potentiometer 2 is applied to the input of velocity resolver 7, the rotor of which is driven by a first output of gear train 8. Gear train 8 is, in turn, driven by motor 9 and is so arranged to produce an output at shaft 10 which rotates in synchronism with the shaft 11 of motor 9, whose displacement corresponds to the angle $\theta$, and an output at shaft 12 which rotates at twice the speed thereof. Two outputs are produced by velocity resolver 7, namely, the product of velocity and sine of the angular displacement of the resolver rotor and the product of velocity and the cosine of said displacement angle. Thus, there is produced, respectively, the vertical and horizontal components of velocity of a propagating sound ray as a function of depth. The vertical component appears on lead 13 while the horizontal component appears on lead 14; they are respectively applied to the depth integrator 15 and range integrator 16. The depth and range integrators respectively operate to produce mechanical outputs representing depth and range of the sound ray at continuously varying points along its path of travel through the propagating medium.

The second output of gear train 8 in the form of shaft 12 drives the rotor of acceleration resolver 17, an electrical input to which is derived from drum and potentiometer 3. Resolver 17 produces two voltages on its stationary quadrature windings only one of which is used, namely, that voltage representing $$\ddot{y}=-V\frac{dV}{dy}\cos 2\theta$$

which is applied to the input of conventional phase inverter 18 one of whose two available phases of output voltage is selected by selector 54 in response to a control signal applied via lead 19.

The selected phase output from inverter 18 is applied to a first input to selector 20, a second input to which is obtained from selector 21. Selector 20 may be a single pole double throw relay energized in response to a control signal applied via lead 22. Assuming that an output from inverter 18 is selected, it is applied to a conventional servo integrator comprising amplifier 23, motor 24, tachometer 25 and signal generator 26. The output of tachometer 25 is fed back in conventional fashion via selector 27 to a second input to amplifier 23. In another mode of operation of said servo integrator to be described later, an attenuated portion of the output of tachometer 25 is fed back via selector 27 to the same second input to amplifier 23. In the latter case, the attenuation of the tachometer feed back signal is accomplished by means of resistor 28. Selector 27 may also be a single pole double throw relay activated in response to a control signal appearing on lead 22.

In the integration mode of operation, a voltage appears on lead 29 which is the integral of the selected output signal of inverter 18 and is applied to a first input of servo amplifier 30, a second input to which is obtained from lead 13. Servo amplifier 30 responds differentially to the signals appearing on leads 13 and 29 and controls motor 9 in response thereto. The fixed field of motor 9 is energized from reference source 5. The angular displacement of output shaft 11 of motor 9 represents the sound ray angle $\theta$ as shown on indicator 31. Thus, said angle is continuously computed in response to the difference between the signals appearing on leads 13 and 29.

The initial boundary condition of $\theta_0$, i.e., the angle at which the sound ray source is oriented, is set into the vertical velocity integrator generally designated by the numeral 32 by means of control knob 33 which displaces the rotor of resolver 34. The reference field of resolver 34 is energized by reference source 5. The initial angle of $\theta_0$ is set into the vertical velocity integrator 32 at the start of a cycle in which a particular sound ray path is traced. At such time an electromechanical programming circuit generally designated by the numeral 35, synchronously driven with the range drive 36 of recorder 37, produces a control voltage which is applied via lead 38 to the control input of selector 21 to permit the output of resolver 34 to be applied to one of the inputs of selector 20.

The aforesaid output of programming circuit 35 is also applied via OR gate 39 and lead 22 to the control input of selector 20 and the control input to gate 40. Selector 20 thus couples the output of selector 21 (which is the output of resolver 34) to a first input to amplifier 23. Gate 40 which is normally closed is opened by the output of programming circuit 35 as applied via OR gate 39 to feed back the output of signal generator 26 to a third input to amplifier 23. In this mode of operation, the servo comprising amplifier 23, motor 24, tachometer 25 and signal generator 26 functions as a positional follow-up servo in a conventional manner whereby the output of signal generator 26 is caused to correspond to the input of amplifier 23 as derived from the output of selector 20. Additionally, the output of programming circuit 35 is coupled via OR gate 39 to the control input of selector 27 which completes a feed back circuit for the application of the aforementioned attenuated portion of the output of tachometer 25 to the input of amplifier 23.

In the positional servo mode of operation, the attenuated output of tachometer 25 is utilized for purposes of servo damping in a conventional fashion while in the integration mode of operation the total output of tachometer 25 is selected by means of selector 27 (while gate 40 is again closed) to achieve integration of the output of selector 20 as applied to amplifier 23.

Figure 3:
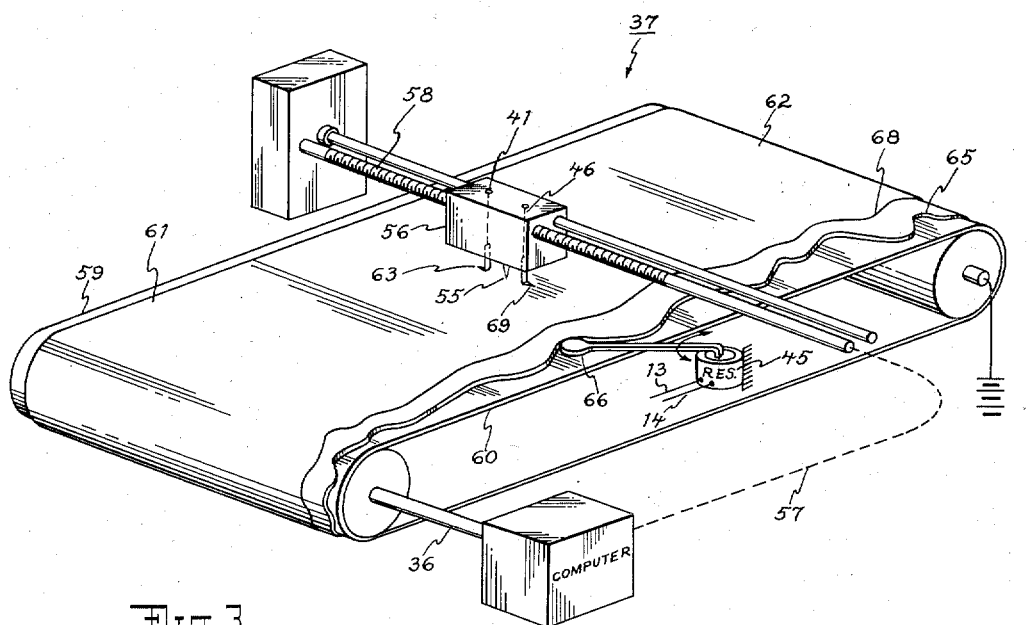
Fig. 3 is a simplified sketch of a representative recorder for use with the invention.

In a representative embodiment of the present invention, recorder 37 may consist of a continuous paper belt driven by the mechanical input of its range drive 36 as shown in Fig. 3. A stylus 55, mounted on a translatable carriage 56, may be moved at right angles to the direction of the paper belt drive by means of the mechanical depth drive input of shaft 57 which is coupled to lead screw 58. Thus, one edge 59 of the paper belt 62 corresponds generally to the top of the sound ray propagating medium while the bottom edge 60 corresponds generally to the bottom thereof. A strip of suitably energized conductive material 61 is mounted along the top edge 59 of the paper belt and is contacted by a conductive feeler 63 synchronously driven with the depth stylus whenever a traced sound ray touches the top of the propagating medium. In such an event, the sound ray is reflected and this occurrence is simulated by reversing the direction of operation of both vertical velocity integrator 32 and depth integrator 15 of Fig. 2. Reversal of the depth integrator will cause the translation of carriage 56 transporting the indicating stylus 55 to reverse in direction.

Referring again to Fig. 2, contact by the sound ray of the top surface of the propagating medium is determined in the manner described and a suitable voltage is produced at terminal 41 designated surface sensor of recorder 37. The output of surface sensor 41 is applied via OR gate 42 simultaneously to the control inputs of selector 54 and selector 64. Said selectors respond thereto by coupling opposite phase versions of their input signals to their respective outputs. The signal input to inverter 43 is derived from reference source 5 while the signal input to inverted 18 is obtained from the output of acceleration resolver 17 as previously described.

The output of selector 64 is applied to the motor and tachometer control fields of servo integrator 44. Servo integrator 44 may be the same as the previously described vertical velocity integrator 32. A second initial boundary condition, namely, initial depth of the sound ray source ($y_0$) is set into servo integrator 44 by means of control 70 when operating said integrator as a positional servo precisely as was done in the case of vertical velocity integrator 32 when its corresponding initial boundary condition of $\theta_0$ was set up.

The bottom of a water propagating medium will generally not be planar but will be irregular as is the case with the ocean floor. When a sound ray is reflected from such an irregular surface, the ray will be reflected by an angle equal to the angle of its incidence plus twice the angle that the bottom surface makes at the point of ray incidence with respect to a horizontal. To introduce such angular correction, a second strip 65 is attached to the bottom of the paper belt of recorder 37, said strip forming a solid graph of uniform thickness whose amplitude is proportional to the value of twice the angular deviation of the propagating medium bottom from a horizontal. The strip 65 when translated with the motion of the paper belt of recorder 37, may be considered as a bottom slope cam. A bottom slope cam follower 66 is arranged to follow the contour of the bottom slope cam, in turn proportionately displacing the rotor of bottom slope resolver 45. Resolver 45 derives a first input to a respective one of its fixed coils from lead 14 and a second input from lead 13. If the resolver rotor angle is anything but zero, the voltage induced in each rotor winding will be a function of the voltage on both of the fixed coils. If the resolver angle is designated $2\alpha$ (where $\alpha$ is the bottom slope), the voltage induced in one of the rotor coils will be $$V \sin \theta \cos 2\alpha + V \cos \theta \sin 2\alpha = V \sin (\theta + 2\alpha)$$

This is the value of $\dot{y}$ immediately after a bottom reflection.

This information $V \sin (\theta + 2\alpha)$ is generated continuously and when a bottom reflection occurs, it is fed into the vertical velocity integrator 32 via lead 67 of Fig. 2. The voltage output at terminal 46 of recorder 37 which occurs at the time of a bottom reflection is applied via OR gate 39 to the control inputs to selectors 20 and 27 and gate 40 to transform vertical velocity integrator 32 into a positional servo in the aforementioned manner. In essence, a new "$\theta_0$" is inserted into vertical velocity integrator 32 from which further computation proceeds. An output signal is thus obtained from resolver 45 which is proportional to $V \sin (\theta + 2\alpha)$ where $\alpha$ is the slope of the propagating medium bottom relative to a reference horizontal.

In addition to the bottom slope cam 65 affixed to the lower edge of the paper belt 62 of recorder 37 there is also affixed thereto a second suitably energized conductive strip 68 having a contour precisely the same as the bottom surface of the propagating medium. A second feeler contact 69, similar to contact 63 is also mounted on translatable carriage 56 of recorder 37. Upon contact of the ray with the medium bottom, an output is produced at terminal 46 of recorder 37 designated as the bottom sensor. Said output is applied via normally open gate 47 and OR gate 42 to the control inputs of selectors 54 and 64 to reverse the direction of operation of vertical velocity integrator 32 and depth integrator 15.

In the event that the progating sound ray should contact the medium bottom while the sound ray is travelling in an upward direction, the direction of integration of depth integrator 15 should not be reversed. This occurrence is possible where the sound ray is travelling in an upward direction, but the slope of the medium bottom is greater than the slope of the path travelled by the ray so that the bottom intercepts the ray. The reversal of depth integrator 15 upon such an interception by the bottom of the propagating sound ray would cause the stylus 55 of recorder 37 to "travel through" the bottom of the propagating medium indicating the impossible situation where the sound ray should penetrate rather than be reflected from said bottom.

To preclude such a situation, phase demodulator 48 is provided receiving a first input from lead 13 and a reference input from source 5. The phase of a signal on lead 13 is indicative of the direction (up or down) in which the sound ray is travelling. Thus, the output of phase demodulator 48 will be of a first polarity when the ray is travelling in an upward direction and of an opposite polarity when the ray is travelling in a downward direction.

That polarity corresponding to the travel of the ray in an upward direction causes gate 47 to close thus precluding the transmission therethrough of the output voltage from bottom sensor 46 and preventing the reversal of depth integrator 15.

In operation, the invention computes the path of a sound ray originating from a predetermined depth and travelling at an original angle as set into the computer by $y_0$ control 70 and $\theta_0$ control 33. In the case of a reflection of the ray from the top surface of the propagating medium in the case of water, for example, no new initial angle need be set into the vertical velocity integrator. The only requirement of readjustment is that the direction of operation of depth integrator 15 be reversed as previously described. In the case of a bottom reflection, however, where said bottom surface is not generally horizontal as is the case with the top surface, a new initial angle must be set into vertical velocity integrator 32 before the computation and plotting of the sound ray proceeds.

The establishment of a new $\theta$ upon reflection from a non-horizontal bottom surface is accomplished by operating vertical velocity integrator 32 in its positional mode of operation. Inasmuch as some time is required for the shaft of servo motor 24 to reorient itself at the proper angle in response to a bottom reflection, it is necessary that operation of recorder 37 be stopped during said interval. The present invention provides for such operation by causing gates 49 and 50 to close, said gates normally being open. An indicium of the operation of vertical velocity integrator 32 as a positional servo is the appearance of an output signal from tachometer 25 on line 51. Said output signal disappears when the shaft of motor 24 has assumed its final rest position.

The voltage appearing on lead 51 is applied to gate 52 to cause it to open thereby coupling the output of bottom sensor 46 (occurring only at the time a bottom reflection occurs) to gate 49 and 50. Gates 49 and 50 are thereby caused to close, preventing the application of the signals appearing on leads 13 and 14, respectively, to servo integrator 44 and servo integrator 53.

From the foregoing description it can be seen that the objects of the present invention have been achieved by the provision of an improved sound wave ray tracer including an analogue computer for solving the true differential equations determining the path of propagation of a sound ray through a medium. Means are included to provide for the effects of ray reflection from both top and bottom boundaries of the propagating medium. Inasmuch as true differential equations of propagation are solved, no restriction is imposed upon the angular deviation of the sound ray with respect to a horizontal. Additionally, mechanical means are provided, responsive to the analogue computer output, for the production of a permanent record of the sound ray pattern.

While separate function generators have been disclosed and described in connection with Fig. 2 for the production of velocity and the product of velocity and velocity gradient potentials, respectively, it should be noted that alternatively, only one function generator need be employed with the other function being computed therefrom.

It should also be observed that computer means may be substituted for cam 65, cam follower 66 and resolver 45 for the production of an electrical signal proportional to twice the angular slope of the bottom boundary of the propagating medium.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A sound wave ray tracer comprising means for generating first and second signals representing, respectively, the velocity (V) and the product of velocity and velocity gradient $$\left(V\frac{dV}{dy}\right)$$

of a sound ray propagating through a medium as a function of depth, means for continuously computing the angle of ray propagation relative to a horizontal as a function of depth, means for separately multiplying the sine and the cosine of said angle with said first signal to produce, respectively, third and fourth signals, means for multiplying the cosine of twice said angle with said second signal to produce a fifth signal, first, second and third means for integrating, respectively, said third, fourth and fifth signals, said means for computing being differentially responsive to said third signal and to the output of said third integrating means, and recording means having two inputs for orthogonal actuation, each said input being coupled to the output of a respective one of said first and second integrating means.

2. Apparatus as defined in claim 1 wherein said first and said third integrating means respectively include means for inserting the original constants of integration representing the initial depth of the sound ray source and the initial angular orientation thereof relative to a horizontal.

3. A sound wave ray tracer comprising means for generating first and second signals representing respectively, the velocity (V) and the product of velocity and velocity gradient $$\left(V\frac{dV}{dy}\right)$$

of a sound ray propagating through a medium as a function of depth, means for continuously computing the angle of ray propagation relative to a horizontal as a function of depth, means for separately multiplying the sine and the cosine of said angle with said first signal to produce, respectively, third and fourth signals, means for multiplying the cosine of twice said angle with said second signal to produce a fifth signal, first, second and third means for integrating, respectively, said third, fourth and fifth signals, said means for computing being differentially responsive to said third signal and to the output of said third integrating means, and recording means for plotting sound rays having two inputs for orthogonal actuation, each said input being coupled to the output of a respective one of said first and said second integrating means, said recording means including means for sensing the interception of a plotted ray by the top and bottom boundaries of the propagating medium.

4. A sound wave ray tracer comprising means for generating first and second signals representing, respectively, the velocity (V) and the product of velocity and velocity gradient $$\left(V\frac{dV}{dy}\right)$$

of a sound ray propagating through a medium as a function of depth, means for continuously computing the angle of ray propagation relative to a horizontal as a function of depth, means for separately multiplying the sine and the cosine of said angle with said first signal to produce, respectively, third and fourth signals, means for mutiplying the cosine of twice said angle with said second signal to produce a fifth signal, first, second and third means for integrating, respectively, said third, fourth and fifth signals said means for computing being differentially responsive to said third signal and to the output of said third integrating means, recording means having two inputs for orthogonal actuation for plotting sound rays, each said input being coupled to the output of a respective one of said first and said second integrating means, said recording means including means for sensing the interception of a plotted ray by the top and bottom boundaries of the propagating medium, and means for reversing the operation of said first and third integrating means in response to the outputs of said means for sensing.

5. A sound wave ray tracer comprising means for generating first and second signals, representing, respectively, the velocity (V) and the product of velocity and velocity gradient $$\left(V\frac{dV}{dy}\right)$$

of a sound ray propagating through a medium as a function of depth, means for continuously computing the angle of ray propagation relative to a horizontal as a function of depth, means for separately multiplying the sine and cosine of said angle with said first signal to produce, respectively, third and fourth signals, means for multiplying the cosine of twice said angle with said second signal to produce a fifth signal, first, second and third means for integrating, respectively, said third, fourth and fifth signals, said means for computing being differentially responsive to said third signal and the output of said third integrating means, recording means having two inputs for orthogonal actuation for plotting sound rays, each said input being coupled to the output of a respective one of said first and second integrating means, said recording means including means for sensing the interception of a plotted ray by one of the boundaries of the propagating medium, means for generating a signal proportional to twice the slope angle of said one of the boundaries of said propagating medium relative to the horizontal, means for mutiplying said third signal with the cosine of twice said slope angle to produce a sixth signal, means for multiplying said fourth signal with the sine of twice said slope angle to produce a seventh signal, means for summing said sixth and seventh signals to produce an eighth signal, and means responsive to said sensing means for applying as a constant of integration said eighth signal to said third means for integrating.

6. Apparatus comprising means for generating signals commensurate with the horizontal and vertical components of velocity of a sound ray propagating through a medium as a function of depth, means for generating a signal commensurate with the vertical component of acceleration of said sound rays as a function of depth, means for computing a signal commensurate with the vertical component of velocity from said generated acceleration component, means for comparing the signals commensurate with generated and computed vertical velocity components, and for generating therefrom a signal commensurate with the angle of propagation of said ray relative to a horizontal, means for integrating the signals commensurate with generated components and recording means responsive to the signals commensurate with integrated generated components for plotting the path of propagation of said ray.

References Cited in the file of this patent

UNITED STATES PATENTS

| 2,634,909 | Lehmann | Apr. 14, 1953 |
| 2,687,580 | Dehmel | Aug. 31, 1954 |
| 2,796,681 | Ringham | June 25, 1957 |